US010062225B2

(12) United States Patent
Borg et al.

(10) Patent No.: US 10,062,225 B2
(45) Date of Patent: Aug. 28, 2018

(54) PORTABLE ACCESS CONTROL COMMUNICATION DEVICE, METHOD, COMPUTER PROGRAM AND COMPUTER PROGRAM PRODUCT

(71) Applicant: ASSA ABLOY AB, Stockholm (SE)

(72) Inventors: Anders Borg, Vallentuna (SE); Mats Cederblad, Haesselby (SE); Daniel Garmen, Bromma (SE); Tomas Jonsson, Roenninge (SE); Peter Siklosi, Taeby (SE)

(73) Assignee: ASSA ABLOY AB (SE)

( * ) Notice: Subject to any disclaimer, the term of this patent is extended or adjusted under 35 U.S.C. 154(b) by 33 days.

(21) Appl. No.: 14/901,773

(22) PCT Filed: Jul. 3, 2014

(86) PCT No.: PCT/EP2014/064172

§ 371 (c)(1),
(2) Date: Dec. 29, 2015

(87) PCT Pub. No.: WO2015/001014

PCT Pub. Date: Jan. 8, 2015

(65) Prior Publication Data

US 2016/0371903 A1 Dec. 22, 2016

(30) Foreign Application Priority Data

Jul. 5, 2013 (EP) .................................... 13175333

(51) Int. Cl.
*H04M 3/00* (2006.01)
*G07C 9/00* (2006.01)

(52) U.S. Cl.
CPC ..... *G07C 9/00103* (2013.01); *G07C 9/00309* (2013.01); *G07C 9/00706* (2013.01);
(Continued)

(58) Field of Classification Search
CPC ....................... H04M 1/72533; G07C 9/00103
(Continued)

(56) References Cited

U.S. PATENT DOCUMENTS 5,561,331 A * 10/1996 Suyama ............. E05B 19/0082 180/287
2006/0219776 A1 10/2006 Finn
2007/0296545 A1 * 12/2007 Clare ...................... E05B 67/00 340/5.64

FOREIGN PATENT DOCUMENTS

CN 1163690 10/1997
CN 101685556 3/2010
(Continued)

OTHER PUBLICATIONS

Official Action with English Translation for China Patent Application No. 201480038150.X, dated Feb. 7, 2017, 12 pages.
(Continued)

*Primary Examiner* — Chuck Huynh
(74) *Attorney, Agent, or Firm* — Sheridan Ross P.C.

(57) ABSTRACT

It is presented a portable access control communication device comprising: a housing for protecting a key device, the access control communication device; a socket arranged to hold a blade of a key device, the socket comprising a connector for communication with the key device; a cellular radio communication module; and a controller. The controller is arranged to communicate, using the cellular radio communication module, with an access control device over a cellular communication network when a key device is provided in the socket such that there is electric contact between the key device and the socket. A corresponding method, computer program and computer program product area also presented.

16 Claims, 3 Drawing Sheets

(52) U.S. Cl.
CPC ..... *G07C 9/00944* (2013.01); *G07C 9/00817* (2013.01); *G07C 2009/0088* (2013.01); *G07C 2009/00388* (2013.01); *G07C 2009/00761* (2013.01); *G07C 2009/00841* (2013.01); *G07C 2009/00952* (2013.01)

(58) Field of Classification Search
USPC ......................... 455/420, 410, 411, 418, 419
See application file for complete search history.

(56) References Cited

FOREIGN PATENT DOCUMENTS

| | | | |
|---|---|---|---|
| DE | 10100843 | | 6/2001 |
| EP | 1 696 392 | A2 | 8/2006 |
| FR | 2 654 556 | A1 | 5/1991 |
| GB | 2 402 840 | A | 12/2004 |
| JP | 3298736 | | 7/2002 |

OTHER PUBLICATIONS

International Search Report and Written Opinion prepared by the European Patent Office dated Oct. 22, 2014, for International Application No. PCT/EP2014/064172.
International Preliminary Report on Patentability (Chapter II) prepared by the European Patent Office dated May 5, 2015 for International Application No. PCT/ EP2014/064172.
Official Action for Australia Patent Application No. 2014286132, dated Sep. 11, 2017, 4 pages.
Official Action with English Translation for China Patent Application No. 201480038150.X, dated Apr. 10, 2018, 12 pages.

* cited by examiner

PORTABLE ACCESS CONTROL COMMUNICATION DEVICE, METHOD, COMPUTER PROGRAM AND COMPUTER PROGRAM PRODUCT

CROSS REFERENCE TO RELATED APPLICATIONS

This application is a national stage application under 35 U.S.C. 371 and claims the benefit of PCT Application No. PCT/EP2014/064172 having an international filing date of Jul. 3, 2014, which designated the United States, which PCT application claimed the benefit of European Patent Application No. 13175333.7 filed Jul. 5, 2013, the disclosures of each of which are incorporated herein by reference.

TECHNICAL FIELD

The invention relates to an access control communication device, associated method, computer program and computer program product for facilitating communication between a key device and an access control device.

BACKGROUND

Access control systems based on electronic access are provided today using a variety of different topologies. One such solution is when electronic lock devices are installed without a power supply. The lock devices may then be powered when a matching key device is inserted, using an electrical connection with the key device.

An issue exists in how lock devices are provided with up-to-date access rights. For example, if a person loses a key device, it should be easy and reliable for an operator of the access control system to bar the lost key device from gaining access to any lock devices of the access control system.

In the prior art, the key devices are updated using dedicated key update devices connected to laptop computers. While this can provide updated access rights to the key devices for provision to the lock devices, the key update devices are large and cumbersome, whereby the keys are not updated very often. This leads to compromised security since a significant amount of time can flow from an operator updating access rights and the updated access rights being propagated to all lock devices.

SUMMARY

It is an object to provide a more convenient way to provide communication between an access control device and a lock device and/or key device.

According to a first aspect, it is presented a portable access control communication device comprising: a housing for protecting a key device, the access control communication device; a socket arranged to hold a blade of a key device, the socket comprising a connector for communication with the key device; a cellular radio communication module for communication over a cellular communication network; and a controller. The controller is arranged to communicate, using the cellular radio communication module, access management data with an access control device over a cellular communication network when a key device is provided in the socket such that there is electric contact between the key device and the socket, the access control device managing access for plurality of lock devices. Such an access control communication device greatly simplifies communication between key device and access control device compared to the prior art. Moreover, such an access control communication device can be made small and could e.g. be carried in a pocket of a user. The communication can occur from the key device to the access control device and/or vice versa.

The controller may be arranged to perform any one or more of the following communication of access management data with the access control device when a key device is provided in the socket: receiving updated access rights for one or more lock devices, receiving updated access rights specifically for the key device, receiving an updated validity time for the key device, receiving an updated time for a clock of the key device, sending an audit trail for one or more lock devices and sending an audit trail for the key device.

The controller may be arranged to only perform the communication of access management data with the access control device when a trigger condition has been determined to be true.

The trigger condition may be true when a timer of the access control communication device expires.

The access control communication device may further comprise a user input device, in which case the trigger condition is true when the user input device is actuated.

The access control communication device may further comprise a code input device, in which case the controller may be arranged to deactivate a key device when it is inserted in the socket and only reactivate the key device when a correct code has been entered using the code input device.

The controller may be further arranged to send a deactivation information message to the access control device after the key device has been deactivated.

The access control communication device may further comprise a code input device, in which case wherein the controller may be arranged to extend a validity time of a key device provided in the socket, when a correct code has been entered using the code input device.

The electric contact may be a galvanic contact.

According to a second aspect, it is presented a method, performed in a portable access control communication device, the access control communication device comprising a housing for protecting a key device. The method comprises the steps of: determining that a key device is provided in a socket of the access control communication device such that there is electric contact between the key device and a connector of the socket, the socket being arranged to hold a blade of the key device; and communicating, using a cellular radio communication module of the access control communication device, access management data with an access control device over a cellular communication network.

The step of communicating may comprise performing any one or more of the following tasks of communication of access management data with the access control device: receiving updated access rights for one or more lock devices, receiving updated access rights specifically for the key device, receiving an updated validity time for the key device, receiving an updated time for a clock of the key device, sending an audit trail for one or more lock devices, the audit trail being received from the key device and sending an audit trail for the key device.

The method may further comprise the steps of: determining whether a trigger condition is true, in which case the step of communicating with the access control device only occurs when the trigger condition has been determined to be true.

The trigger condition may be true when a timer of the access control communication device expires.

The trigger condition may be true when a user input device of the access control communication device is actuated.

The method may further comprise the steps of: deactivating the key device when it is provided in the socket such that there is electric contact between the key device and the socket; receiving, using a code input device, a code entered by a user; and activating the key device when the code is determined to be correct.

The step of communicating with the access control device may comprise sending a deactivation information message to the access control device after the step of deactivating.

The method may further comprise the steps of: receiving, using a code input device, a code entered by a user; and extending a validity time of a key device provided in the socket.

The step of determining that a key device is provided in a socket may comprise determining that there is galvanic contact between the key device and the connector of the socket.

According to a third aspect, it is provided a computer program comprising computer program code which, when run on a portable access control communication device comprising a housing for protecting a key device, causes the access control communication device to: determine that a key device is provided in a socket of the access control communication device such that there is electric contact between the key device and a connector of the socket; and communicate, using a cellular radio communication module of the access control communication device, with an access control device over a cellular communication network.

According to a fourth aspect, it is provided a computer program product comprising a computer program according to the third aspect and a computer readable means on which the computer program is stored.

This provides better security by supplying access data between the key device and the access control device.

It is to be noted that any feature of the first, second, third and fourth aspects may be applied, where appropriate, to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
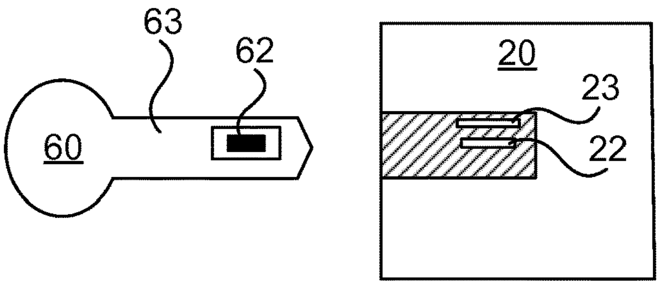
FIG. 1 is a schematic diagram illustrating a key device and a lock device in an access control system in which embodiments presented herein can be applied.

FIG. 1 is a schematic diagram illustrating an access control system in which embodiments presented herein can be applied. There are one or more lock devices 20. The lock devices 20 perform access control of key devices 60 presented to it, e.g. by inserting a key device 60 in question in the lock device 20, whereby the lock device 20 is powered by the key device 60. Also, there is communication of operational access data between the key device 60 and the lock device 20, whereby the lock device and/or the key device perform electronic access control of the key device 60 for opening the lock device 20. When access is granted, the lock device 20 is set to an openable state, whereby a user can e.g. open a door which is access controlled by the lock device 20.

The key device 60 comprises a connector 62 and a blade 63, which are electrically insulated from each other. The lock device 20 comprises a socket with a first connector 22 and an optional second connector 23. The first connector 22 is positioned such that, when the key device 60 is inserted in the socket, the first connector 22 makes electric contact with the connector 62 of the key device 60. The connection can be galvanic, or alternatively an inductive connection. In the case of an inductive connection, the connectors do not need to physically connect. Analogously, the second connector 23 is positioned such that, when the key device 60 is inserted in the socket, the second connector 23 makes electric contact with the blade 63 of the key device 60. This arrangement can provide a dual terminal connection between the key device 60 and the lock device 20 when the key device 60 is inserted in the socket of the lock device 20. It is to be noted that a dual connection is not necessary for an inductive connection. The electrical connection is used both for communication between the key device 60 and the lock device 20 and for powering the lock device 20 by transferring electric power from a power supply of the key device 60 to the lock device 20. Alternatively, separate connectors (not shown) can be provided for powering the lock device 20 and communication between the key device 60 and the lock device 20.

Figure 2:
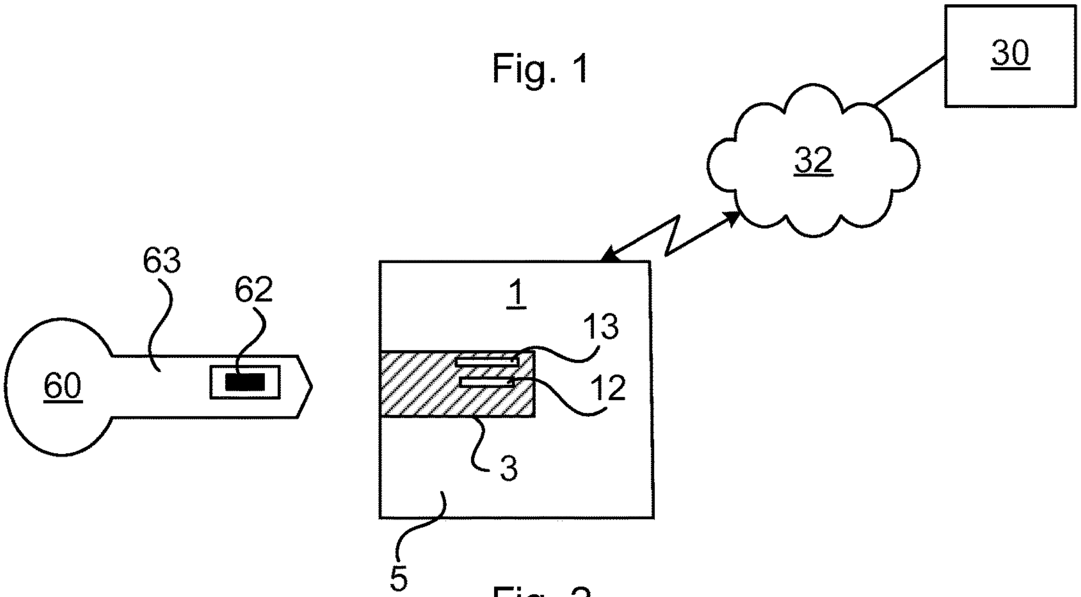
FIG. 2 is a schematic diagram illustrating a key device and an access control communication device in an access control system in which embodiments presented herein can be applied.

FIG. 2 is a schematic diagram illustrating a key device and an access control communication device in an access control system in which embodiments presented herein can be applied.

The key device 60 is of the same type as the one shown in FIG. 1. A portable access control communication device 1 comprises a housing 5 for protecting a key device 60 when it is inserted in the access control communication device 1. A socket 3 is arranged to hold a blade 63 of a key device 60.

The access control communication device 1 can be formed to detachably hold the key device in place, such that the key device 60 and the access control communication device 1 together form a combined portable device, which could be easily carried, e.g. in a pocket of a user. Optionally, the dimensions of the access control communication device are adapted to the key device as to form a combined portable device where the exterior physical transition between the key device 60 and the access control communication device 1 is smooth, further improving portability of the combined portable device.

The access control communication device 1 comprises a socket 3 with a first connector 12 and an optional second connector 13. The first connector 12 is positioned such that, when the key device 60 is inserted in the socket, the first connector 12 makes electric contact with the connector 62 of the key device 60. The connection can be galvanic, or alternatively an inductive connection. In the case of an inductive connection, the connectors do not need to physically connect. Analogously, the second connector 13 is positioned such that, when the key device 60 is inserted in the socket, the second connector 13 makes electric contact with the blade 63 of the key device 60. Analogously to the lock device 20, this arrangement can provide a dual terminal connection between the key device 60 and the access control communication device 1. It is to be noted that a dual connection is not necessary for an inductive connection. The electrical connection can be used both for communication between the key device 60 and the access control communication device 1 and for power transfer.

The dual terminal connection is used for communication of access management data between the key device 60 and the access control communication device 1. The access control communication device 1 communicates in turn with an access control device 30 via a cellular network 32 e.g. any one or a combination of LTE (Long Term Evolution), UMTS (Universal Mobile Telecommunications System) utilising W-CDMA (Wideband Code Division Multiplex), CDMA2000 (Code Division Multiple Access 2000), or any other current or future wireless network, as long as the principles described hereinafter are applicable. In this way, the access control communication device 1 acts as a gateway, providing access to the access control device 30 for the key device 60 and vice versa.

The access control device 30 acts as a controller in the access control system and may e.g. be implemented using one or more computers, e.g. a server and an operator terminal. An operator can thereby control access control rights and monitor other security aspects of the access control system using the access control device 30. In other words, the access control device is used to manage access for plurality of lock devices, as well as a plurality of key devices.

The connection of access management data between the key device 60 and the access control device 30 can be used for several purposes. Access management data is here to be interpreted as data for managing access data. In particular, access management data is not the same as operational access data communicated between the key device 60 and the lock device 20 when access is to be granted or denied. For example the key devices 60 can be used for providing management data from the access control device 30 to the lock devices 20. To make this happen, the key devices 60 connect to the access control device 30 on occasion to download such management data. When each one of these key devices 60 is later inserted in a lock device 20, the management data bound for the lock device 20 is transferred to the lock device 20.

One example will now be presented related to when the access management data comprises access rights. The key device 60, on occasion, downloads access rights that are later provided to the lock devices 20 when the key device 60 is inserted. The access rights are stored in a memory of the key device 60, thus providing an asynchronous communication to (or from) the lock devices 20. These access rights can include a revocation list, indicating key devices that are to be barred from gaining access. The revocation list is global in the access control system and thus applies to all key devices 60 and all lock devices 20. In this way, any changes to the revocation list are propagated efficiently and indiscriminately throughout the access control system to lock devices even though these do not have a power supply by themselves and can not communicate directly with the access control device 30. Nevertheless, certain items in the access rights may be associated with a particular lock device or a group of lock devices.

If a user in the access control system loses a key device, the operator of the access control device 30 can update the access rights in the access control device such that the revocation list includes the identity of the lost key device. After one or more key devices 60 download the new revocation list via the access control communication device, the revocation list is provided to any lock devices 20 in which the key device 60 is inserted. Even the lost key device can download the new revocation list if it is lost while inserted in the access control communication device, in which case on an attempt of a violator to gain access using the lost key device will be denied.

Alternatively or additionally, the access rights can include an access list, comprising a list of identifiers of key devices which are to gain access. The access rights can be global within the system, for all lock devices, for individual lock devices or for a group of lock devices.

Alternatively or additionally, each key device 60 can, on occasion, receive access management data comprising an updated validity time for the key device 60 in question. Each key device 60 may have access rights which are only valid until a specific time, after which the key device 60 loses its access rights. When the key device 60 is in contact with the access control device, its validity time can be extended. In this way, the key device 60 loses its access rights after a certain amount of time unless it makes contact with the access control device 30. In one embodiment, updated access rights are downloaded on the same occasion when the validity time of the key device is extended.

The significance of this combination of the access management data of access rights and validity times will be illustrated in an example now. Let us say that a key device 60 gets stolen. The original owner reports this and the access control device 30 is updated with new access rights, barring the stolen key device from access to lock devices in the access control system. The violator does not want these new access rights to be provided to the lock devices and may prevent communication between the key device and the access control device 30 from happening. However, the validity time will eventually expire and the stolen key device 60 is prevented from gaining access in that way. If the violator then somehow knows that the validity time has expired and allows the key device 60 to communicate with the access control device 30, the validity time may possibly be extended, but the key device 60 will also download the updated access rights, whereby the stolen key device 60 is barred from access in that way. Optionally, the access control device 30 will not even grant an extended validity time since the stolen key device could be flagged as barred (or stolen).

Alternatively or additionally, each key device 60 can, on occasion, receive an updated time for the clock of the key device. This ensures that the clock of the key device is accurate, which ensures the validity times are applied accurately.

The communication of access management data between the key devices 60 and the access control device 30 can also be used in the other direction, towards the access control device 30. The mechanism is the same, where communication of access management data occurs via the access control communication device 1. But here, data is transmitted from the lock device 20 to the key device 60. When the key device 60 makes contact with the access control device 30, the data is uploaded to the access control device 30.

In this way, the key device 60 uses its memory as temporary storage for data from the lock devices 20 to the access control device 30. Analogously, the access control communication device 1 can also use its memory as temporary storage for data from the lock devices 20 to the access control device 30. For example, an audit trail from the lock devices 20 can be uploaded to the access control device 30 in this way. The audit trail to the access control device includes data about successful and/or failed attempts of gaining access to the lock device in question.

Also, an audit trail from the key device 60 can be uploaded to the access control device 30, indicating successful and/or failed attempts of the key device in question gaining access to the lock devices.

Figure 3:
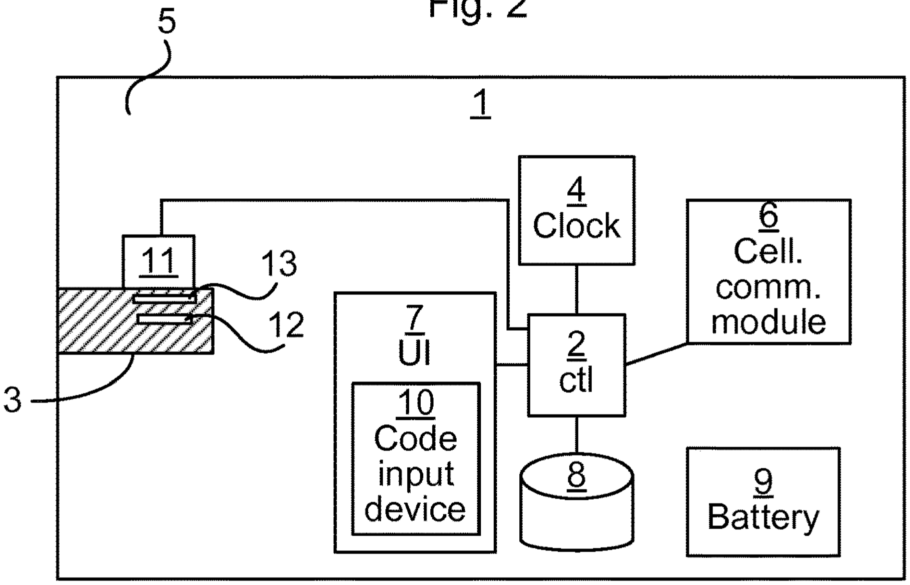
FIG. 3 is a schematic diagram illustrating the access control communication device of FIG. 2.

FIG. 3 is a schematic diagram illustrating some components of the access control communication device 1 of FIG. 2. A processor, also known as a controller, 2 is provided using any combination of one or more of a suitable central processing unit (CPU), multiprocessor, microcontroller, digital signal processor (DSP), application specific integrated circuit etc., capable of executing software instructions stored in a memory 8, which can thus be a computer program product. The processor 2 can be arranged to execute software instructions stored in the memory 8 to perform any one of the methods described with reference to FIGS. 4 and 5 below.

The memory 8 can be any combination of read and write memory (RAM) and read only memory (ROM). The memory 8 also comprises persistent storage, which, for example, can be any single one or combination of solid state memory, magnetic memory, or optical memory. Optionally, part or all of the memory 8 is included in a Subscriber Identity Module (SIM), thereby implementing secure storage and application execution environment, and can provide credentials which can be used by a cellular communication module 6.

Optionally, the processor 2 and the memory 8 can be provided in a single microcontroller unit (MCU).

The cellular communication module 6 comprises one or more transceivers, comprising analogue and digital components, and a suitable number of antennas. The cellular communication module 6 is provided for communication with a cellular network such as the cellular network 32 of FIG. 2, to connect with the access control device 30.

A clock 4 is provided and a battery 9 is provided to power all electrical components of the access control communication device 1. The battery 9 can be a rechargeable battery or an exchangeable disposable battery.

Optionally, a user interface 7 is provided to allow a user to input data and/or to receive output of data. For example, the user interface 7 can comprise one or more of a display, which is optionally touch sensitive, a keypad, a microphone, a speaker, etc.

Optionally, a code input device 10 is provided as part of the user interface 7. In one embodiment, the code input device 10 is used to reactivate a key device 60, in a case where the access control communication device 1 has previously deactivated the key device 60 when it is inserted in the access control communication device 1. In one embodiment, the code input device 10 is used to allow the user to extend the validity time of a key device 60 in contact with the access control communication device 1, when access to the access control device is not available over the cellular network e.g. due to current radio conditions/radio isolation. The code input device can e.g. be a keypad or part of a suitably controlled touch sensitive display.

Optionally, an electronically controlled attachment 11 is provided connected with the processor 2. The attachment 11 is controllable to engage with an inserted key device to stop the inserted key device from being separated from the access control communication device 1. For example, when a key device is deactivated, the attachment can be activated to lock the inserted key device in the access control communication device 1. Analogously, the processor can release the attachment whereby an inserted key device can be removed from the access control communication device 1, e.g. when a correct code has been entered.

Other components of the access control communication device 1 are omitted in order not to obscure the concepts presented herein.

Figure 4:
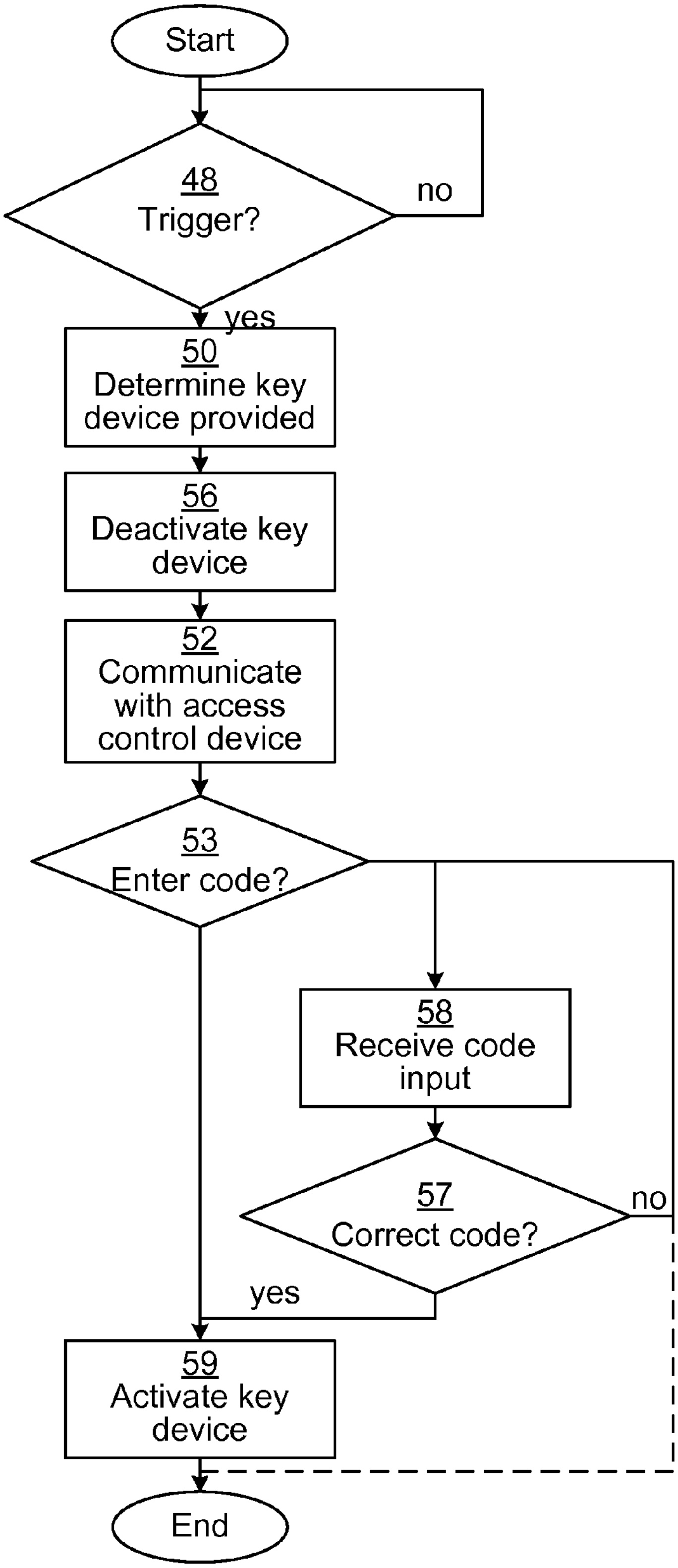
FIG. 4 is a schematic diagram illustrating an embodiment of a method performed in the access control communication device of FIGS. 2 and 3.

FIG. 4 is a schematic diagram illustrating an embodiment of a method performed in the access control communication device of FIGS. 2 and 3. The method can e.g. be implemented in the access control communication device 1 using software instructions stored in the memory 8 which, when executed by the processor (controller) 2 causes the processor to perform any embodiment of the method described below.

In an optional trigger step 48, it is determined whether a trigger condition is true. If this is the case, the method continues to a determine key device provided step 50. Otherwise, the method repeats the conditional trigger step 48, optionally after an idle period.

The trigger condition can e.g. be that a timer of the access control communication device expires. Alternatively or additionally, the trigger condition can be that a user input element (7 of FIG. 3) of the access control communication device is actuated, indicating an update command. When this step is omitted, the method starts with a determine key device provided step 50.

In the determine key device provided step 50, the access control communication device determines that a key device is provided in a socket of the access control communication device such that there is electric contact between the key device and a connector of the socket.

In an optional deactivate key device step 56, the key device is deactivated. In this way, it is not possible to use the key device until it is activated again, e.g. by providing the correct code and/or successfully downloading access rights form the access control device.

In the communicate with access control device step 52, the access control communication device communicates access management data with the access control device when possible, acting as a gateway for communication described with reference to FIG. 2 above, e.g. to update access rights and/or to provide audit logs. The access control communication device can thus act as a gateway between the key device and the access control device for access management data. It is to be noted that the access control communication device is not a gateway for communication between the key device and the lock device. If the access control communication device is unable to communicate with the access control device, the access control communication device is considered to be off-line.

When the deactivate key device step 56 is performed, the access management data optionally includes a deactivation information message. In this way, the access control device 30 is made aware of the key device in question being deactivated, whereby a central operator can obtain information of all key devices in a system as to what key devices are deactivated and what key devices are active. In one scenario, the operator of the access control system has a procedure that at the end of a day, all key devices should be inserted into a respective access control communication device for deactivation. Since the status of each deactivation is communicated to the access control device, the adherence to this procedure can easily be monitored and acted upon.

In the conditional enter code step 53, it is determined whether a code needs to be entered. This can e.g. be every time the key device is connected, to allow activation after the deactivation in the optional deactivate key device step 56 presented above or due to the access control communication device (and thus any connected key device) being off-line and a code needs to be entered to extend the validity time of the key device in contact with the access control communication device. In one embodiment, it is required to enter a code every so often to extend the validity time of a key device. This could be every time the validity time is extended or less often (or more often) than that. This prevents someone not knowing the code from gaining access using a lost key device, even if the revocation list has not been updated yet. If a code needs to be entered, the method continues to a receive code input step 58. Otherwise, the method ends.

In the receive code input step 58, a code is received from the user of the access control communication device using the code input device of the access control communication device.

In a conditional correct code step 57, it is evaluated whether the code which was input by the user is correct or not. If this is the case, the method continues to an activate key device step 59. Otherwise, the method either returns to the receive code input step 58 or the method ends, if too many unsuccessful attempts of code input have been detected.

In an optional activate key device step 59, the key device is activated. This allows the key device to be used again for gaining access to lock devices.

When the activate key device step 59 is performed, the access control communication device then optionally sends access management data comprising an activation information message. In this way, the access control device 30 is made aware of the key device in question being activated, such that the information in the access control device regarding what key devices are deactivated and active is up to date.

When a correct code is required for activation of the key, as described above, the key device can be securely stored while inserted in the access control communication device. If the key is lost, it can only activated by entering the correct code. Optionally, the access control communication device comprises an electronically controlled attachment, which attaches the key device in the deactivate key step 56 and only releases the key device in the activate key device step 59.

Optionally, the method is repeated to be ready for more communication between the access control device and the key device.

Figure 5:
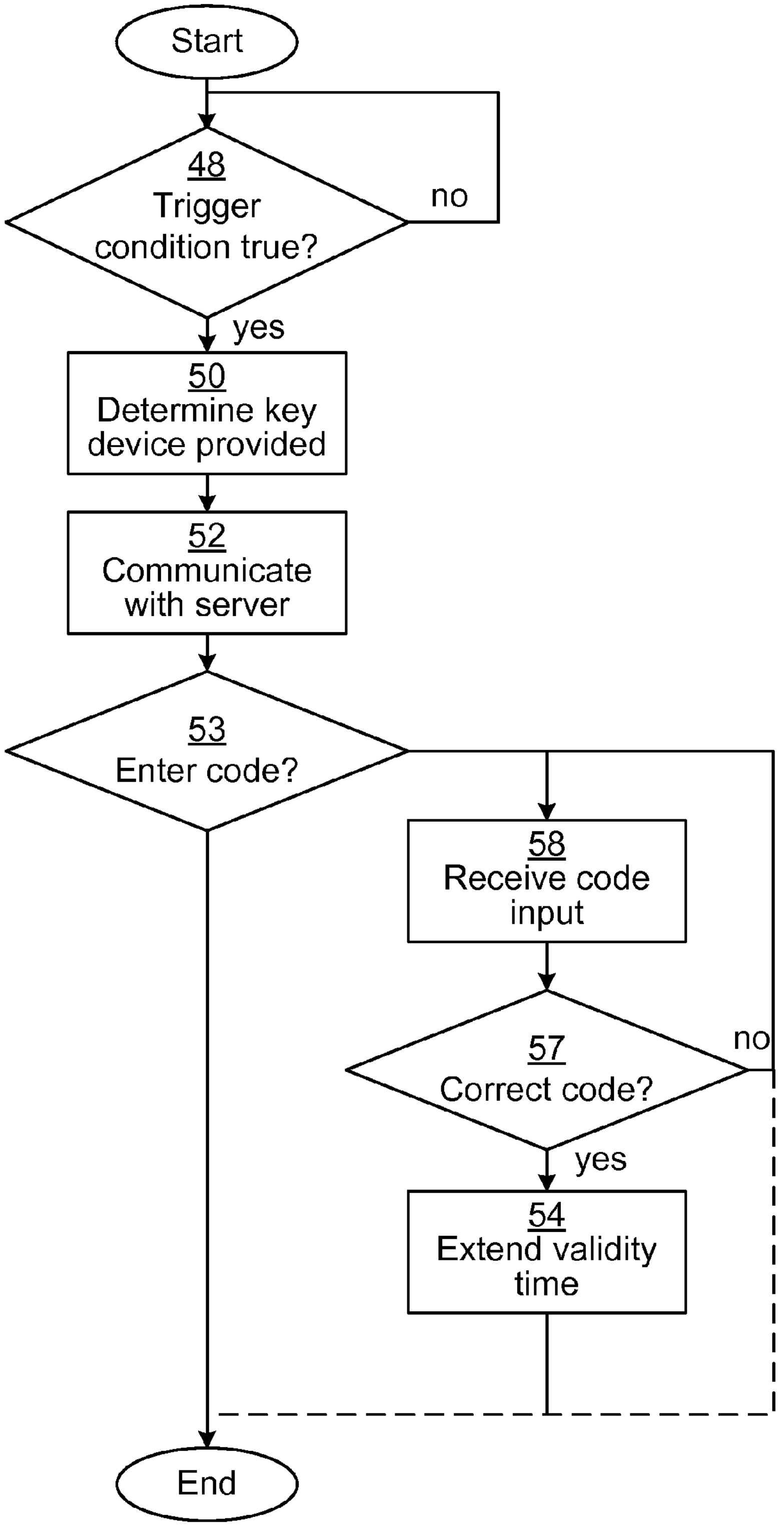
FIG. 5 is a schematic diagram illustrating an embodiment of a method performed in the access control communication device of FIGS. 2 and 3.

FIG. 5 is a schematic diagram illustrating an embodiment of a method performed in the access control communication device of FIGS. 2 and 3. The method of this embodiment is similar to the method illustrated in FIG. 4 and only differences to that method will be described here. The method can e.g. be implemented in the access control communication device 1 using software instructions stored in the memory 8 which, when executed by the processor (controller) 2 causes the processor to perform any embodiment of the method described below.

In this embodiment, the steps 56, 59 to deactivate and activate the key device are omitted, but may optionally be included here also.

After a correct code is verified in the conditional correct code step 57, the method continues to an extend validity time step 54.

In the extend validity time step 56, the validity time of the key device in contact with the access control communication device is extended, as explained above.

Optionally, the method is repeated to be ready for more communication between the access control device and the key device.

Here now follows a list of embodiments from another perspective, enumerated with roman numerals.

i. A portable access control communication device comprising:
- a housing for protecting a key device;
- a socket arranged to hold a blade of a key device, the socket comprising a connector for communication with the key device;
- a cellular radio communication module; and
- a controller arranged to communicate, using the cellular radio communication module, with an access control device over a cellular communication network when a key device is provided in the socket such that there is galvanic contact between the key device and the socket.

ii. The access control communication device according to embodiment i, wherein the controller is arranged to perform any one or more of the following communication with the access control device when a key device is provided in the socket: receiving updated access rights for one or more lock devices, receiving updated access rights specifically for the key device, receiving an updated validity time for the key device, receiving an updated time for a clock of the key device, and sending an audit trail for one or more lock devices and sending an audit trail for the key device.

iii. The access control communication device according to embodiment i or ii, wherein the controller is arranged to only perform the communication with the access control device when a trigger condition has been determined to be true.

iv. The access control communication device according to embodiment iii, wherein the trigger condition is true when a timer of the access control communication device expires.

v. The access control communication device according to embodiments iii or iv, wherein the access control communication device further comprises a user input device, and the trigger condition is true when the user input device is actuated.

vi. The access control communication device according to any one of the preceding embodiments further comprising a code input device, wherein the controller is arranged to deactivate a key device when it is inserted in the socket and only reactivate the key device when a correct code has been entered using the code input device.

vii. The access control communication device according to any one of the preceding embodiments further comprising a code input device, wherein the controller is arranged to extend a validity time of a key device provided in the socket, when a correct code has been entered using the code input device.

viii. A method, performed in a portable access control communication device, the access control communication device comprising a housing for protecting a key device, the method comprising the steps of:

determining that a key device is provided in a socket of the access control communication device such that there is galvanic contact between the key device and a connector of the socket; and communicating, using a cellular radio communication module of the access control communication device, with an access control device over a cellular communication network.

ix. The method according to embodiment viii, wherein the step of communicating comprises performing any one or more of the following communication tasks with the access control device: receiving updated access rights for one or more lock devices, receiving updated access rights specifically for the key device, receiving an updated validity time for the key device, receiving an updated time for a clock of the key device, sending an audit trail for one or more lock devices, the audit trail being received from the key device and sending an audit trail for the key device.

x. The method according to embodiment viii or ix, further comprising the steps of:

determining whether a trigger condition is true;

and wherein the step of communicating with the access control device only occurs when the trigger condition has been determined to be true.

xi. The method according to embodiment x, wherein the trigger condition is true when a timer of the access control communication device expires.

xii. The method according to embodiments x or xi, wherein the trigger condition is true when a user input device of the access control communication device is actuated.

xiii. The method according to any one of embodiments viii to xii, further comprising the steps of:

deactivating the key device when it is provided in the socket such that there is galvanic contact between the key device and the socket;

receiving, using a code input device, a code entered by a user; and activating the key device when the code is determined to be correct.

xiv. The method according to any one of embodiments viii to xiii, further comprising the steps of:

receiving, using a code input device, a code entered by a user; and extending a validity time of a key device provided in the socket.

xv. A computer program comprising computer program code which, when run on a portable access control communication device comprising a housing for protecting a key device, causes the access control communication device to:

determine that a key device is provided in a socket of the access control communication device such that there is galvanic contact between the key device and a connector of the socket; and communicate, using a cellular radio communication module of the access control communication device, with an access control device over a cellular communication network.

xvi. A computer program product comprising a computer program according to embodiment xv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A portable access control communication device comprising:

a housing for protecting a key device;

a socket arranged to hold a blade of a key device, the socket comprising a connector for communication with the key device;

a cellular radio communication module for communication over a cellular communication network;

a controller arranged to communicate, using the cellular radio communication module, access management data with an access control device over the cellular communication network when the key device is provided in the socket such that there is electric contact between the key device and the socket, the access control device managing access for a plurality of lock devices, wherein the controller is arranged to perform any one or more of the following communication of access management data with the access control device when the key device is provided in the socket: receiving updated access rights for one or more lock devices, receiving updated access rights specifically for the key device, receiving an updated validity time for the key device, receiving an updated time for a clock of the key device, sending an audit trail for the one or more lock devices and sending an audit trail for the key device; and a code input device, wherein the controller is arranged to deactivate the key device when it is inserted in the socket and only reactivate the key device when a correct code has been entered using the code input device.

2. The access control communication device according to claim 1, wherein the controller is arranged to only perform the communication of access management data with the access control device when a trigger condition has been determined to be true.

3. The access control communication device according to claim 2, wherein the trigger condition is true when a timer of the access control communication device expires.

4. The access control communication device according to claim 2, wherein the access control communication device further comprises a user input device, and the trigger condition is true when the user input device is actuated.

5. The access control communication device according to claim 1, wherein the controller is further arranged to send a deactivation information message to the access control device after the key device has been deactivated.

6. The access control communication device according to claim 1 further comprising a code input device, wherein the controller is arranged to extend a validity time of the key device provided in the socket, when the correct code has been entered using the code input device.

7. The portable access control communication device according to claim 1, wherein the electric contact is a galvanic contact.

8. A method, performed in a portable access control communication device, the access control communication device comprising a housing for protecting a key device, the method comprising the steps of:

determining that the key device is provided in a socket of the access control communication device such that there is electric contact between the key device and a connector of the socket, the socket being arranged to hold a blade of the key device;

communicating, using a cellular radio communication module of the access control communication device, access management data with an access control device over a cellular communication network, the access control device managing access for a plurality of lock devices, wherein communicating comprises performing any one or more of the following tasks of communication of access management data with the access control device:

receiving updated access rights for one or more lock devices, receiving updated access rights specifically for the key device, receiving an updated validity time for the key device, receiving an updated time for a clock of the key device, sending an audit trail for the one or more lock devices, the audit trail being received from the key device and sending an audit trail for the key device;

deactivating the key device when it is provided in the socket such that there is electric contact between the key device and the socket;

receiving, using a code input device, a code entered by a user; and activating the key device when the code is determined to be correct.

9. The method according to claim 8, further comprising the steps of:

determining whether a trigger condition is true;

and wherein the step of communicating with the access control device only occurs when the trigger condition has been determined to be true.

10. The method according to claim 9, wherein the trigger condition is true when a timer of the access control communication device expires.

11. The method according to claim 9, wherein the trigger condition is true when a user input device of the access control communication device is actuated.

12. The method according to claim 8, wherein the step of communicating with the access control device comprises sending a deactivation information message to the access control device after the step of deactivating.

13. The method according to claim 8, further comprising the steps of:

receiving, using a code input device, a code entered by a user; and extending a validity time of a key device provided in the socket.

14. The method according to claim 8, wherein the step of determining that the key device is provided in the socket comprises determining that there is galvanic contact between the key device and the connector of the socket.

15. A computer program comprising computer program code which, when run on a portable access control communication device comprising a housing for protecting a key device, causes the access control communication device to:

determine that a key device is provided in a socket of the access control communication device such that there is electric contact between the key device and a connector of the socket, the socket being arranged to hold a blade of the key device;

communicate, using a cellular radio communication module of the access control communication device, with an access control device over a cellular communication network, the access control device managing access for a plurality of lock devices, wherein the communication comprises performing any one or more of the following tasks of communication of access management data with the access control device:

receiving updated access rights for one or more lock devices, receiving updated access rights specifically for the key device, receiving an updated validity time for the key device, receiving an updated time for a clock of the key device, sending an audit trail for the one or more lock devices, the audit trail being received from the key device and sending an audit trail for the key device;

deactivate the key device when it is provided in the socket such that there is electric contact between the key device and the socket;

receive, using a code input device, a code entered by a user; and activate the key device when the code is determined to be correct.

16. A computer program product comprising the computer program according to claim 15 and a non-transitory computer readable medium on which the computer program is stored.

* * * * *